United States Patent

[11] 3,584,500

[72] Inventors Ward F. Diehl
New Baltimore;
Robert E Heintz, Royal Oak; Marshall S. Swisher, Detroit, all of, Mich.
[21] Appl. No. 846,377
[22] Filed July 31, 1969
[45] Patented June 15, 1971
[73] Assignee General Motors Corporation
Detroit, Mich.

[54] FLUID LEAKAGE TEST METHOD AND SYSTEM
9 Claims, 7 Drawing Figs.
[52] U.S. Cl. .................................................. 73/39, 73/40
[51] Int. Cl. .................................................. G01m 3/26
[50] Field of Search .................................... 73/39, 40, 40.5, 49.1—.2

[56] References Cited
UNITED STATES PATENTS
| | | | |
|---|---|---|---|
| 3,331,237 | 7/1967 | Strang | 73/40 |
| 3,359,785 | 12/1967 | Fournier | 73/40 |
| 3,412,601 | 11/1968 | Hand | 73/49.2 X |

Primary Examiner—Louis R. Prince
Assistant Examiner—William A. Henry, II
Attorneys—Frank J. Soucek and Charles R. Engle

ABSTRACT: An automatic electrically controlled fluid plumbing test system including separate pneumatic and hydraulic fluid circuits and having application, in one form, to vehicle brake systems. The pneumatic fluid circuit contains solenoid valves that are cycled to selectively actuate a hydraulic fluid pressure-intensifying unit. The hydraulic fluid circuit also contains solenoid-controlled valves and initially supplies the fluid plumbing system with fluid at a line pressure of 20 to 200 p.s.i. completely filling the system. The pneumatic circuit supplies a first air pressure sufficient to actuate the intensifier and develop a relatively high fluid pressure $P_1$ in the system under test, this pressure being approximately 2000 p.s.i. in a vehicle brake system. This pressure is held in the system under test for a time period sufficient to expand the fluid plumbing and test for mechanical defects. The pneumatic system then automatically cycles and supplies a second air pressure to the intensifier whereby a somewhat lower fluid pressure $P_2$ is developed, this pressure being approximately 1600 p.s.i. in a vehicle brake system. The $P_2$ fluid is held in the plumbing system for a time period sufficient to stabilize the plumbing and temporarily arrest all creep and expansion inherent in the lines. This pressure on the fluid is then automatically held in the portion of the plumbing being tested for a predetermined time period and any leakage occurring is registered on a leak meter. If the fluid-plumbing system is acceptable and meets a predetermined standard, electrical control circuitry automatically energizes apparatus for stamping or punching a card indicating approval. In the event a leak occurs; there is excessive air in the system; or in the case of a test concerning a vehicle brake system, the brake warning switch is defective; the cycle is automatically terminated. Upon completion of the test the control circuitry automatically reconditions the test apparatus for use on a subsequent fluid-plumbing system.

INVENTORS
Ward F. Diehl,
BY Robert E. Heintz, &
Marshall S. Swisher
Charles R. Engle
ATTORNEY

FLUID LEAKAGE TEST METHOD AND SYSTEM

The invention relates generally to apparatus for leakage testing fluid systems, and more particularly to an arrangement for testing vehicle hydraulic brake systems.

Therefore, it is the purpose of this invention to provide a method and test apparatus capable of rapidly and accurately testing pressure fluid containing systems on a production assembly line. This purpose is accomplished by including automatic timers in the electrical control circuitry; providing a small leak meter built into an adapter directly connecting to the test system, eliminating the possibility of reading supply plumbing leakage or flexing; utilizing a diaphragm air cylinder to actuate a fluid intensifier plunger thereby substantially reducing friction and supplying fluid at a constant increased pressure; utilizing a single test valve to actuate the meter to register leakage during the test period; and most significantly reducing expansion in the closed pressure fluid system to ranges within test tolerances prior to conducting the leakage test. This latter feature is accomplished by subjecting the fluid system to a first relatively high pressure $P_1$ for a fixed period of time to rapidly expand the system plumbing. The fluid pressure is then reduced to a $P_2$ pressure and allowed to stabilize for a fixed time period. The test valve is then automatically actuated and the fluid, at $P_2$ pressure, is maintained on the system being tested, any leakage from the system being replaced by incoming fluid and being measured on the leak meter. While the plumbing of the system being tested does continue to exhibit some growth while the test is being conducted, this growth is well within desirable test tolerances thereby having little effect on the accurate test results being rapidly obtained. A signalling means responsive to the subsiding of pressure in the test system is incorporated so that the operator does not prematurely remove the adapter allowing fluid to discharge to atmosphere.

Accordingly, among the objects of this invention is the provision of a fluid leak-detecting apparatus easily and reliably connectable to the system under test.

Another object of this invention is the provision of a fluid leak-detecting system including an adapter containing a leak meter directly connecting to the system.

A still further object of this invention is the provision of a vehicle brake leak-detecting system incorporating electrical control circuitry automatically terminating the test if the system contains a leak.

A further object of this invention is the provision of a fluid leak-detecting system subjecting the fluid plumbing under test to a relative high pressure fluid for a fixed period of time removing a majority of the creep and growth from the conduits prior to making the leak test.

Another object of I this invention is the provision of a fluid leak-detecting system subjecting the fluid plumbing under test to a first relatively high pressure fluid for a fixed period of time to remove a majority of the expansion from the test system and automatically reducing the pressure fluid to a second relatively lower value for a fixed time period sufficient for the expansion or creep in the system to stabilize and automatically maintaining this second fluid pressure for a fixed time test period for automatic measurement of any leakage.

A further object of this invention is the provision of a vehicle hydraulic brake leak-detecting system incorporating a precisely calibrated indicator measuring minute quantities of leakage fluid indicating whether a vehicle brake system meets rigid standards.

Another object of this invention is the provision of a hydraulic brake leak-detecting system incorporating visual signals informing the operator that the test pressure has sufficiently subsided so that he may remove the test fixture for a subsequent test.

Another object of this invention is the provision of a fluid leak-detecting system incorporating features for attaching a readout chart tape recorder to monitor all leak tests and test pressures.

Figure 1:
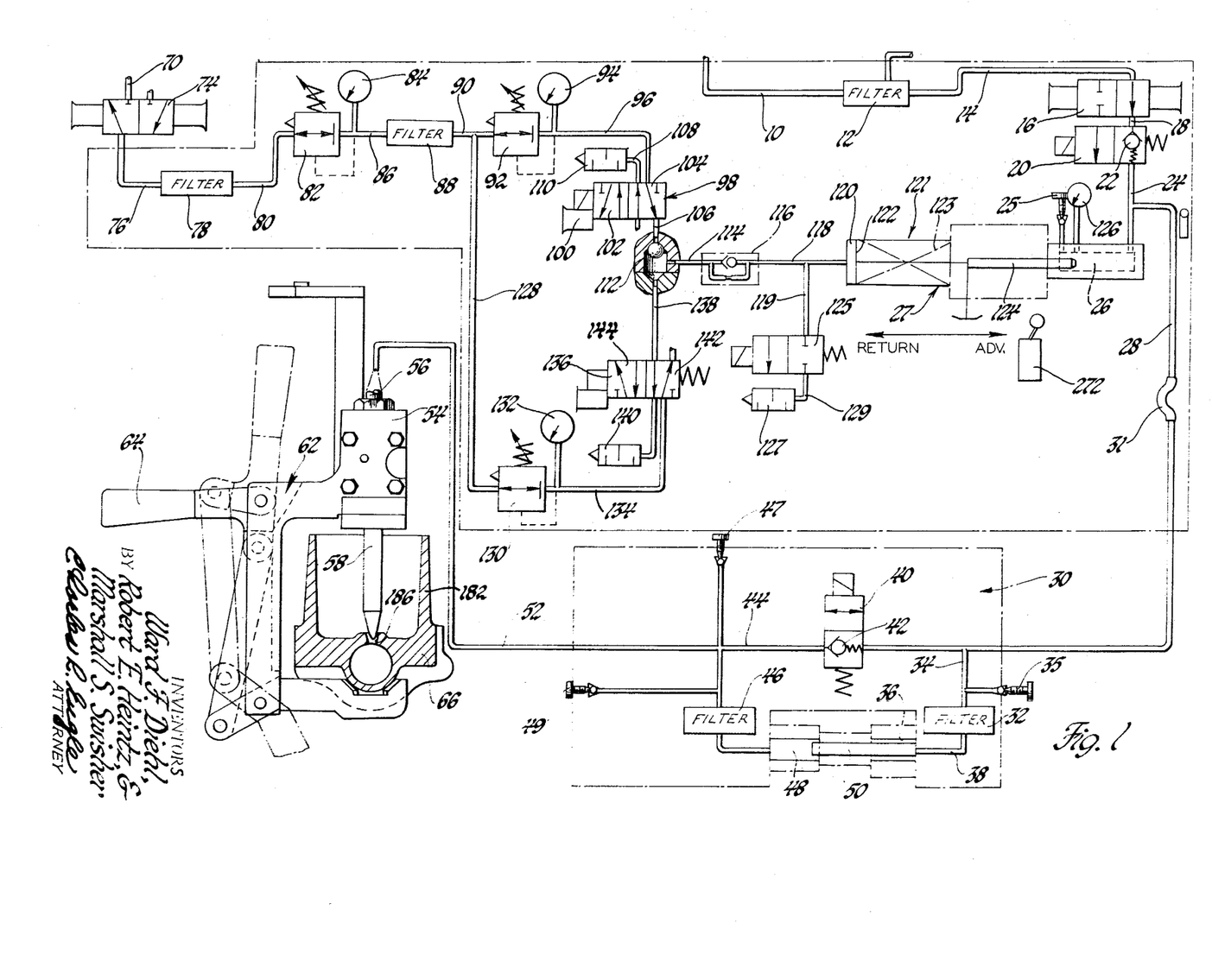
FIG. 1 is a diagrammatic view of the test system fluid circuit directly connected to a vehicle brake master cylinder and containing electrically actuated valves in accordance with the present invention.

Referring now to FIG. 1, the fluid leakage test system includes a brake fluid supply line 10 conducting 20—200 p.s.i. pressure fluid from a plant supply source to an air separator and filter 12 from which the fluid flows through line 14 to a shutoff valve 16. A line 18 connects the shutoff valve 16 with a normally closed solenoid actuated valve 20 containing a spring biased check valve 22 preventing back flow of fluid to the shutoff valve 16. The brake fluid exits valve 20 into line 24 filling chamber 26 of intensifier unit 27 and flows through line 28 to a leak meter 30. The line 28 contains a reinforced flexible connecting hose 31. Leak meter 30 includes a first filter 32 which receives fluid from line 28 through a branch conduit 34 and discharges fluid to a pressure-sensing chamber 36 by way of conduit 38. Conduit 34 connects with a bleed line and plug assembly 35. The line 28 extends beyond branch conduit 34 and connects with a solenoid controlled normally closed test valve assembly 40 containing a check valve 42 controlling the entrance of fluid into conduit 44. The conduit 44 connects with a filter 46 supplying filtered fluid into chamber 48 at the opposite end of a floating piston 50, also movable in pressure-sensing chamber 36, the fluid in chamber 48 acting in opposition to that supplied into chamber 36 through filter 32. A test line and plug assembly 47 and a bleed line and plug assembly 49 are connected with conduit 44 for bleeding and testing leak meter 30. Check valve 42 also prevents flow through conduit 52 connected to a clamp adapter assembly 54 by a threaded fitting 56. The adapter 54 includes a reciprocally mounted probe 58 capable of being fastened to a master cylinder compensating port 186 by a toggle clamp assembly 62. A clamp handle 64, pivotally connected to the adapter 54, engages the probe 58 with the compensating port 186 and simultaneously reciprocates the probe 58 within the adapter 54 unseating a valve assembly later described allowing a metered passage of fluid into master cylinder 66.

Continuing with reference to FIG. 1, this invention also includes a pneumatic fluid circuit including an air supply line 70 receiving shop air in the range of 60—125 p.s.i. from a source not shown, the line 70 being connected to an air supply valve 74. The air supply valve 74 is a two-position valve which in the off position is a safety lockoff-type valve. A line 76 conducts air from valve 74 to a filter 78 from which the air passes through line 80 to a first pressure regulating valve 82. The valve 82 is a downstream responsive valve which can be adjusted to provide a desired downstream pressure and in the instant situation, this valve is set to provide air at 60 p.s.i. as viewed by an indicator 84. Line 86 conducts the 60 p.s.i. air to a filter 88 which in turn is connected by conduit 90 to a second downstream pressure regulating valve 92. The pressure-regulating valve 92 is adjustable to provide a desired downstream pressure as indicated by a dial 94 and in the subject system the valve 92 is adjusted to provide an air pressure of 52 p.s.i. in line 96 which connects with a solenoid actuated control valve 98. The valve 98 is also manually operable by button 100 and is a multiport valve movable between positions 102 and 104 to regulate flow of pressurized air between lines 96, 106 and 114 to a diaphragm air cylinder 121. In position 102 the air is exhausted from diaphragm cylinder 121 out through muffler 110. The regulated pressurized air flows through line 106 to a shuttle check valve 112 and is then directed by the line 114 through a flow control device 116 into line 118 where it enters chamber 120 of the diaphragm air cylinder 121. The pressurized air actuates a schematically illustrated diaphragm 122 against the biasing force of spring 123. Movement of the diaphragm 122 and its attached plunger 124 greatly increases the pressure of the fluid present in intensifier chamber 26 and a bleed line and plug assembly 25 is provided to bleed air therefrom. The highly pressurized fluid is then available in line 28 connecting with the test control valve 40. The pressure of the fluid in chamber 26 is viewed on gauge 126. Line 118 connects with a branch passage 119 that in turn directs pressurized air to a normally closed solenoid actuated exhaust valve 125, the valve 125 being connected to a muffler 127 by a line 129.

A passage 128 connects with passage 90 upstream of pressure regulator 92 and directs pressurized air to a third pressure regulator 130 which is adjustable maintaining air at 40 p.s.i. downstream thereof. An indicator 132 is provided for the set up operator to monitor the pressure in line 134 which is connected to solenoid or manually actuated valve 136 controlling flow to the aforementioned shuttle valve 112. The valve 136 is a two-position multiport valve which, in the deenergized position, connects line 138 with a muffler 140 when portion 142 of the valve is in the position shown. In an energized position valve portion 144 connects line 134 with line 138 to supply 40 p.s.i. air to line 114 and chamber 120 so that the diaphragm 122 moves plunger 124 within fluid chamber 26 for a purpose later to be described.

Figure 2:
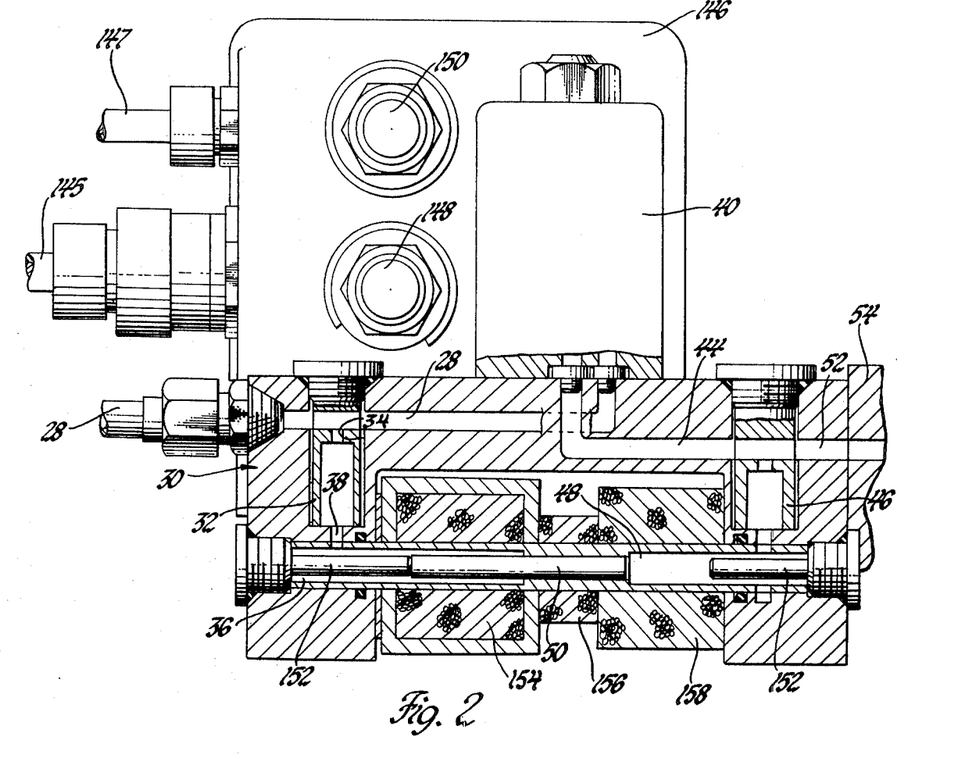
FIG. 2 is a top plan view, partly in section, of the test valve, the connecting adapter, and the leak meter of the subject invention in assembled relationship.

FIG. 2 illustrates the leak meter 30, the test valve 40, a safety light 148, a pushbutton control switch 150, and the clamp adapter 54 in assembled relationship. The two-position test valve 40 and associated electrical control circuitry are mounted within housing 146. The safety light 148 and the pushbutton control switch 150 are also mounted in the housing 146. Cable 145 electrically connects safety light 148 in circuit with the automatic control circuitry regulating the operation of test valve 40 and energization of the safety light 148 as well as the meter control circuitry including reset coil 154, input coil 156 and output coil 158. A second cable 147 electrically connects the meter unit with the master cylinder safety switch such that a test cycle on a vehicle brake system can only be initiated when the test connection has been made on the safety switch. The safety light 148 is energized indicating that the fluid pressure in the master cylinder has subsided and the operator may remove the adapter 54 upon termination of a test cycle. In the lower portion of the assembly, the leak meter 30 is shown including fixed stop members 152 positioned in fluid chambers 36 and 48 limiting movement of piston 50 in either direction. The piston 50 operates within the confines of a series of coils including a reset coil 154, an input coil 156, and an output coil 158. The position of piston 50 is very accurately sensed by these coils and an output signal is generated indicating very slight displacement of the volume of fluid in chamber 48. The position of piston 50 within output coil 158 therefore creates a signal in proportion to leakage. Movement of the piston 0.080 inches indicates one drop of fluid leakage. Line 28 supplies the leak meter 30 with pressurized fluid from the intensifier assembly 27 where it is directed to chamber 36 through passage 38 supplying the fluid against one end of piston 50 while the fluid also continues to flow through passage 28 to the normally closed test valve 40. When energized, test valve 40 directs pressure fluid through passage 44 and filter 46 to chamber 48 on the opposite end of piston 50 while simultaneously conveying pressurized fluid to the clamp adapter 54 where it is subjected to the control of ball check valve 60 shown in FIG. 4.

Figure 3:
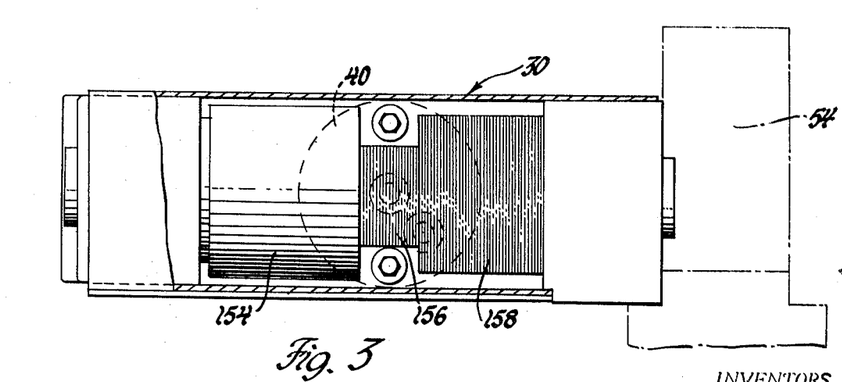
FIG. 3 is a side elevational view, partly in section, of the leak meter shown in FIG. 2.

A side view of the clamp adapter 54, shown in phantom, and test valve assembly 40 is shown in FIG. 3 wherein the adapter assembly 54 is mounted at one end of the leak meter 30 so that the leak meter is directly connected with the fluid being supplied to the master cylinder during the test cycle. It is apparent from this view that there are no flexible connections between the adapter 54 and the leak meter 30, and that the hydraulic fluid under intensified pressure is applied directly to the adapter 54 from passage 52 in the leak meter eliminating the possibility of pressure changes resulting from expansion in flexible lines between the adapter and the leak meter.

Figure 4:
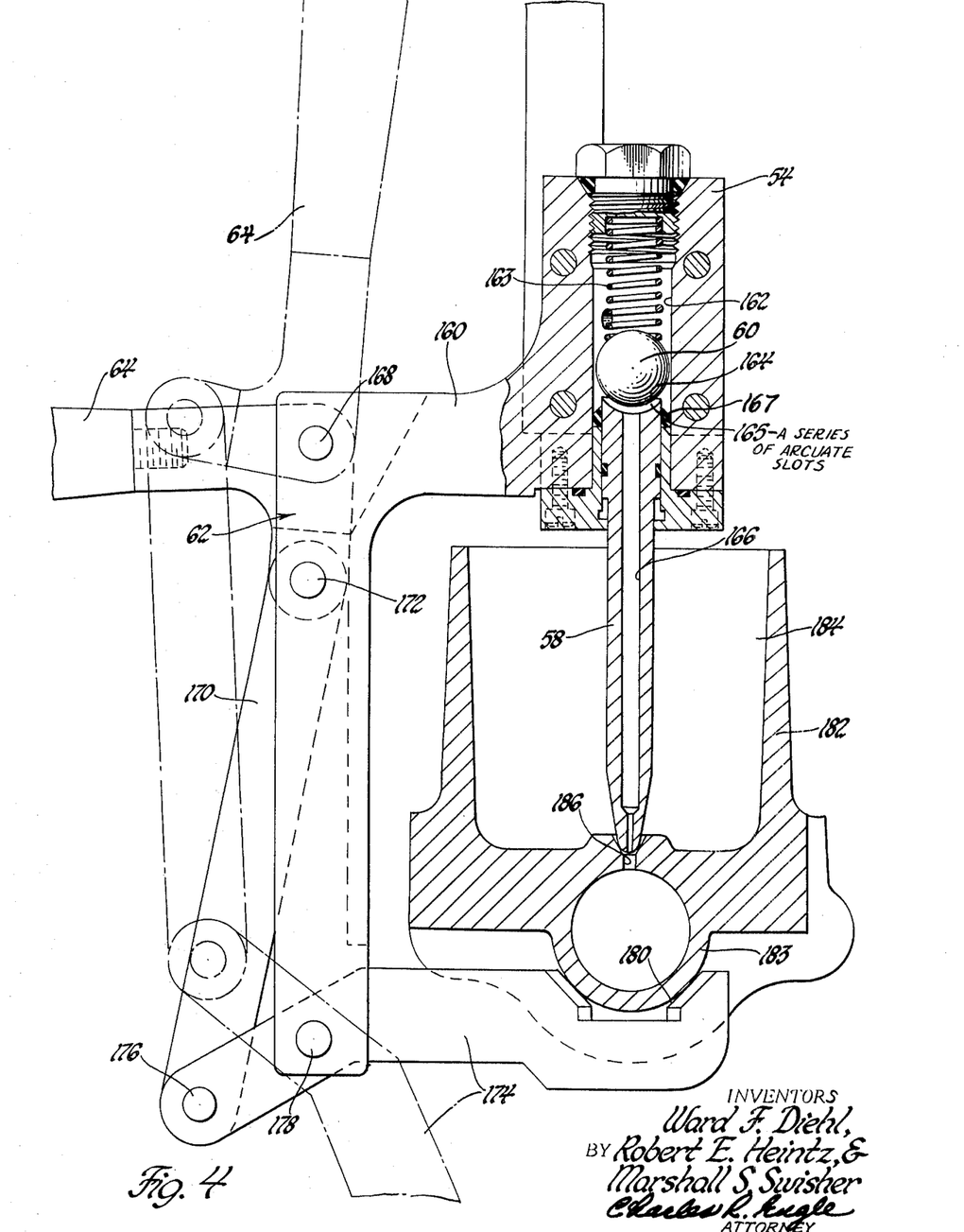
FIG. 4 is an elevational view, partly in section, of the connecting adapter assembly, secured to a master cylinder reservoir, the released position of the adapter being shown in phantom lines.

The adapter clamp assembly 54 is shown in detail in FIG. 4. The adapter is shown as including a rigid L-shaped frame member 160 receiving a plunger 58 within bore 162. Ball valve 60 is biased by a spring 163 against end 164 of plunger 58. In the unattached position the plunger 58 is extended with the spring 163 biasing ball valve 60 against valve seating ring 167 preventing flow of pressurized fluid through passage 166 in plunger 58. Handle 64 is pivotally mounted on frame 160 by a pin 168 and has one end of a link 170 pivotally mounted thereon by a pin connection 172. The other end of link 170 is pivotally connected to a clamping member 174 by pin 176, the clamping member also being connected to frame 160 by a pin 178. The clamping member 174 is formed to contain a V-slot 180 receiving a cylindrical portion 183 of master cylinder 182 when it is clamped in place. In a released position the clamp 174 pivots away from the master cylinder 182 to the position shown by broken lines whereby it is obvious that the plunger 58 may be readily inserted within reservoir 184 to engage compensating port 186 prior to clamping the adapter assembly in place. Actuation of handle 64 to the clamped position depresses plunger 58 against the force of spring 163 moving ball 60 off valve seat 167. Plunger 58 contains a plurality of radial arcuate slots 165 metering flow to passage 166 and compensating port 186 in master cylinder 182.

Figure 5A:
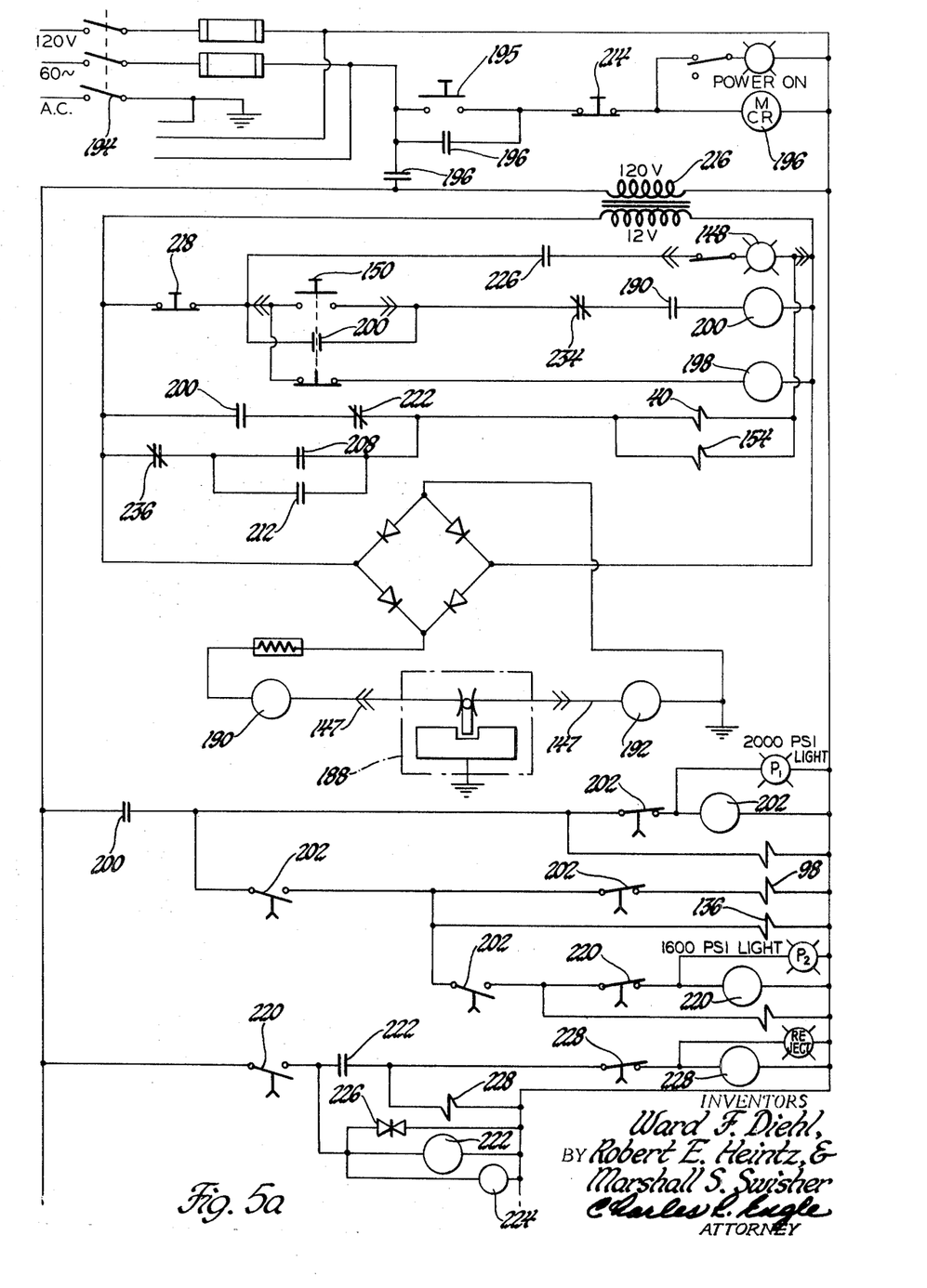
FIG. 5a is a schematic diagram showing a portion of the electrical control circuitry.

Operation and sequence of the electrical control circuitry in relation to the above described fluid plumbing is as follows: With reference to FIG. 5a, the operator initially closes disconnect switch 194 closing the circuit on the source side of a 130-volt AC control circuit. The operator then closes a master start switch 195 energizing a master relay 196 and a relay 198. The master relay 196 energizes the primary coil of transformer 216 and its secondary coil supplies 12-volt AC source to the cycle start circuit. After the electrical cable 147 is connected to the brake safety switch 188, the relays 190 and 192 are supplied with DC voltage through a full wave bridge rectifier. The closing of master start switch 195 energizes the master relay 196 through the emergency stop button 214 and relay 196 holds itself in and prepares the entire circuit for an automatic test cycle. The relay 190 will always be energized and relay 192 will also be energized if the safety switch 188 is not grounded. Relay 190 prepares the circuit of relay 200 permitting starting of the cycle when switch 150 is actuated. The operator then pushes the cycle-start button 150 and relay 200 is energized while relay 198 is deenergized to phase out the accept and reject circuits held in from the previous cycle. Relay 200 holds itself in and energizes test solenoid valve 40 allowing fluid to flow into the vehicle brake system while also energizing test transducer reset coil 154 in the leak meter 30. A first timer 202, set for 10 seconds, is then energized to time the period of application of the first fluid pressure $P_1$, in the case of a vehicle brake system approximately 2000 p.s.i. for purposes of illustration, in the test system. Also, energization of control relay 200 prepares a circuit of reject control relays 204, 206 and 208. Release of the cycle start button 150 reenergizes control relay 198 which activates the holding circuits of the air reject relay 204, grounded safety switch relay 206, system reject relay 208, leak relay 210, and an accept relay 212. The reenergization of control relay 198 also activates an initiating circuit for leak reject relay 208.

When control relay 200 energizes the system expansion timer 202, fluid pressure $P_1$ and $P_2$ solenoid actuated valves 98 and 136 are in turn energized and air is supplied to the intensifier assembly 27 making the $P_1$ 2000 p.s.i. brake fluid available to the system under test. The timer 202 is set for a period sufficient to remove a majority of the expansion in the test system, for example 10 seconds, and subsequently times out to deenergize and close valve 98 while simultaneously energizing a second timer 220. Closing of valve 98 reduces the test system pressure to the $P_2$ value or 1600 p.s.i. in the vehicle brake system due to the air pressure being supplied to the intensifier 27 being reduced from 52 p.s.i. to 40 p.s.i. The timer 220, while timing out during a period of 5 seconds, allows expansion in the test system plumbing to stabilize. The timer 220 then times out and energizes test control relay 222 and energizes a third timer 224. Relay 222 energizes a test timer 228 and its suppression devices 226, and deenergizes the test solenoid valve 40 as well as reset coil 154 in the transducer 30. This relay also prepares the circuit of the punch card relay 230. The energization of test timer 228 prepares the circuit for pilot relay 209 permitting it to read the output of relay 242 should a leak in excess of a predetermined value occur. The timer 224 delays readout of the closing of relay contacts 254 preventing the peak voltage occurring during the deenergization of coil 154 being sensed by transducer 30. Test timer 228 is set for 10 seconds and actually times the fluid leak test period during which the system is subjected to a locked-in pressure of 1600 p.s.i. in chambers 36 and 48 at both ends of the piston 50 as illustrated in FIG. 2. It is during this period that any leakage is measured to determine whether the system meets a desired standard. The test solenoid valve 40 remains closed for the 10 second test period and the piston 50 is free to move in response to any leak in the system. As indicated in FIG. 2 the test fluid is applied to reference chamber 36 and test chamber 48 at opposite ends of the transducer piston 50. If the system meets the desired standards, the timer 228 times out and opens the circuit to pilot reject relay 209. In this situation the timer 228 energizes accept control relay 212 which in turn energizes an inspection card punch solenoid 230, a reset timer 232, and relay 234; the timer being set for 1½ seconds. At this time exhaust valve 125 is energized opening the air circuit to atmosphere through muffler 127. Relay 234 deenergizes relay 200, which resets the test portion of the circuit, and opens the initiating circuit of reject relay 208. Relay 200 deenergizes valve 136 thereby preventing loss of air from the source to atmosphere through the exhaust valve 125. Diaphragm 122 is retracted by spring 123 drawing plunger 124 outwardly of chamber 26. Simultaneously the energizing of accept relay 212 results in energization of valve 40 and reset coil 154 of the transducer 30. The opening of valve 40 allows fluid from the test system to be drawn into the intensifier chamber 26 thereby reducing the pressure in the test system to approximately 30 p.s.i. During the leakage test, timer 228 along with timer 224 actually controls the test circuitry. Pilot relay 209 and leak relay 210 can only be energized during the test period of 10 seconds controlled by timer 228. Upon completion of the 10 second period, test timer 228 opens the circuits of pilot leak relay 209 and accept relay 212. The deenergizing of test relay 222 deenergizes card punch solenoid 230 and resets circuits to the test timer 228 and the pilot relay 209 conditioning the circuit to leak reject relay 210.

Reset timer 232 permits the intensifier plunger 124 to withdraw and pull fluid out of the test system before valve 20 is opened thereby allowing full reduction in system pressure before any makeup fluid is added to the system. Timing out, timer 232 energizes control relay 236 deenergizing test solenoid valve 40 and reset coil 154 and then subsequently energizes fuel supply valve 20 supplying the makeup fluid. Light 148 is also energized at this time indicating the system pressure has subsided and the cycle is completed. The operator then manually disconnects the brake safety switch cable 147, removes the stamped card from the card punch solenoid 230 and removes the test adapter 54 from the vehicle master cylinder for use in a subsequent test.

Figure 5B:
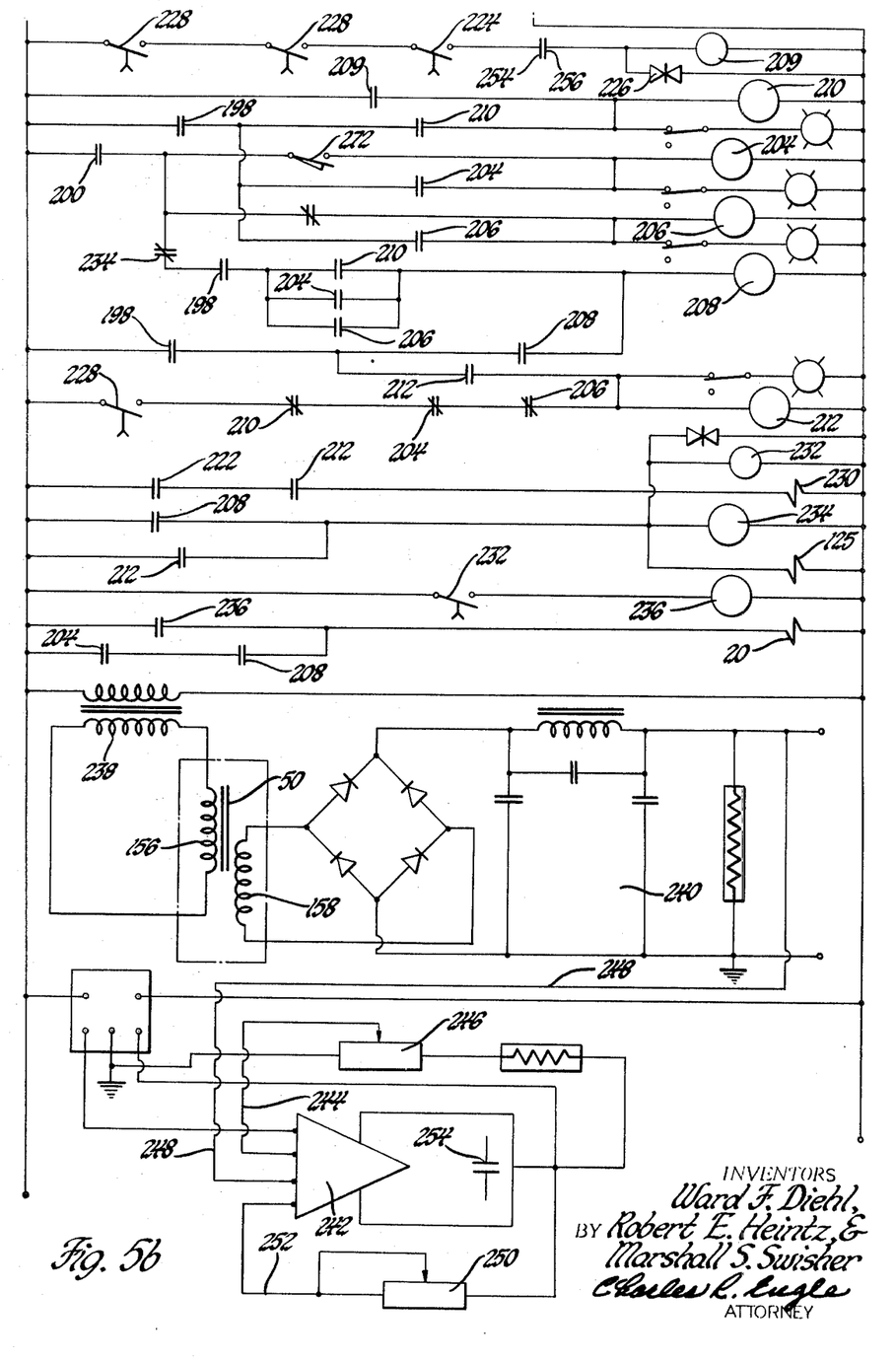
FIG. 5b also is a schematic diagram showing another portion of the electrical control circuitry.

As is readily apparent from FIG. 5b, a leak detection circuit includes a transformer 238, the secondary of which supplies a 6 volt source to the input coil 156 of the transducer leak meter 30. The position of piston 50 determines the voltage induced into output coil 158 providing an indication of any leakage as the piston moves in response to the volume of test fluid present in chamber 48 against the reference volume in chamber 36. A standard DC supply circuit 240 rectifies the output of coil 158 prior to the signal being furnished to a PICOPOWER analog comparator relay 242 where the output of the coil 158 is measured against a reference voltage. The comparator relay 242 receives the reference voltage through line 244 as determined by the setting of a potentiometer 246. A particular displacement of piston 50 creates a specific voltage that is induced into output coil 158. The transducer leak meter 30 is calibrated by positioning the stops 152 in relation to a specific volume of fluid leakage. This movement of the piston 50 provides a specific induced voltage into the output coil 158. The voltage is then used to determine a reference voltage set in by the potentiometer 246 to calibrate the transducer for the reading of a specific quantity of fluid leakage in relation to the movement of piston 50. In one application of this invention, movement of the piston 0.080 inches indicates one drop of fluid leakage. Output of the coil 158, through the rectifying circuit 240, is applied to the comparator relay 242 via line 248. A balance adjustment of the relay is obtained through a second potentiometer 250 which is connected in the circuit by line 252. Any time the rectified voltage from the output coil 158 exceeds the reference voltage, the contacts 254 in relay 242 close energizing pilot relay 209, which, in turn, energizes leak relay 210, whereupon the circuitry automatically indicates a rejection of the system under test.

Figure 6:
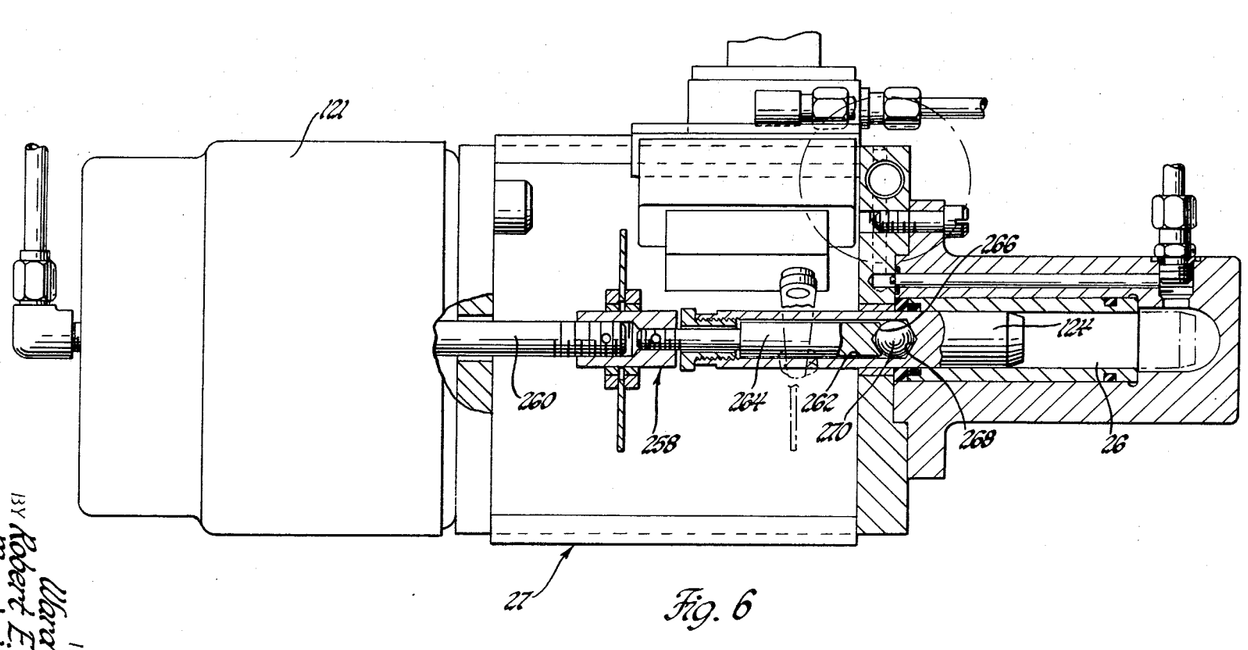
FIG. 6 is an elevational view, partly in section, illustrating the pressure intensifier utilized in the fluid circuitry of this invention.

Referring now to FIG. 6, an intensifier assembly 27 is shown in full scale wherein the fluid motor 121 is rigidly connected to intensifier plunger 124 by a threaded connection assembly 258 which adjustably connects fluid motor shaft 260 to the plunger 124. The plunger 124 includes a bore 262 receiving a shaft extension 264 terminating in a conical end portion 266. The bottom wall 268 of bore 262 is also conical in form and a ball 270 is placed between these adjacent conical surfaces. The shaft extension 264 comprises a diameter slightly less than that of the bore 262 providing for slight angular adjustments between the axial alignment of the shaft extension 264 and the plunger 124.

In operation, the adapter 54 is attached to the rear vent 186 in master cylinder 182 and rigidly clamped thereto by the toggle assembly 62 illustrated in FIG. 4, wherein clamp 174 engages the bottom portion 183 of the master cylinder. With this arrangement the clamp arm 174 swings away from the master cylinder and the adapter 54 can readily be vertically moved away from the master cylinder assembly upon completion of the test.

For the grounded safety switch fault check, the operator connects electrical cable 147 to the master cylinder brake safety switch 188 and safety switch relays 190 and 192 are energized. If the brake switch is grounded, a fault condition exists and the voltage across switch 192 will be zero and the circuitry will energize a dash-mounted vehicle signal light. In this condition when the cycle is started the normally closed relay 192 will energize control relay 206 which will hold itself in and energize reject relay 208. A reject relay 208 in turn holds itself in and energizes reset time delay 232 and relay 234 stopping the test cycle and starting the reset cycle of the fluid changing circuit. At this time relay 208 energizes test solenoid valve 40 and transducer reset coil 154 permitting brake fluid to flow back into the test unit changing system. Fluid supply valve 20 is also energized, after the fluid has been withdrawn into the intensifier chamber 26, to allow brake fluid from the supply source to flow into the test unit as required. When the reject is an air reject energizing relay 204, the system is filled with fluid simultaneously with the retraction of the intensifier plunger 124 in order to prevent air entering into the test system. The control circuitry also contains a limit switch 272 which is positioned to measure the amount of movement of plunger 124 and should the intensifier stroke exceed a predetermined amount, the limit switch 272 is energized actuating the air reject relay 204. Relay 204 then holds itself in and energizes the reject relay 208 as previously mentioned. This opens the initiating circuit for the accept relay 212 while simultaneously energizing the brake fluid supply valve 20 permitting flow of brake fluid into the intensifier as it resets. In the situation where the plunger 124 actuates limit switch 272, the reject relay 208 also initiates the reset cycle previously described in relation to the brake safety switch circuit.

The pilot leak relay 209 is energized when the comparator relay 242 closes contacts 254 in response to excessive leakage in the vehicle brake system. The pilot leak relay 209 energizes leak reject relay 210 which energizes relay 208 initiating the reset cycle in the manner previously described. The leak test circuit is sufficiently sensitive to respond to a leak of one drop or more in a period of 10 seconds. As previously indicated movement of 0.080 inches of piston 50 corresponds to one drop leakage.

It is significant that the leak meter 30 and the adapter 54 are secured together without any resilient fluid conducting lines therebetween. This provides for a direct reading of leakage in the system as the meter in effect is directly connected thereto. This eliminates the problem of line expansion in flexible fluid-connecting lines and also eliminates the leak meter 30 reading leakage that may occur outside the vehicle brake system as in other currently used systems. Other significant advantages of this system reside in the utilization of a relatively high initial pressure for a predetermined time period in the system to remove any expansion in the lines and fittings which may effect the reading of the leak meter 30. Therefore, this is the reason for the intensifier assembly 27 providing the system initially with $P_1$-2000 p.s.i. fluid to stretch out the system for a period of 10 seconds prior to performing the actual test. The stabilizing timer 220 is set for 5 seconds and allows a pressure of the $P_2$-1600 p.s.i. to exist in the brake system so that the system is stabilized prior to conducting the test at this pressure. The stabilization period of 5 seconds coupled with the reduction in pressure to the 1600 p.s.i. fluid in the case of a vehicle brake system provides a significant reduction in the rate of expansion of the test system plumbing and while it is appreciated that the plumbing does continue to expand it does so at a greatly reduced rate bringing the rate of expansion well within desired test tolerances. Since this rate of expansion is within the test tolerances a reliable reading is obtained through leak meter 30.

After the stabilization, the third test timer 228, set for 10 seconds, is then energized and it is during this period that the leak meter 30 and piston 50 accurately measure the leakage in the system should there be any loss of fluid. A further advantage of the system is the exhausting of pressurized air from the pressure side of diaphragm 122, which actuates intensifier plunger 124, through a line 119 to an exhaust valve 121 and through a muffler 125 to atmosphere upon the termination of each test cycle so that the plunger 124 is positively reset by the spring 123. This allows reduction of pressure in the brake system before valve 40 closes and valve 20 opens to supply makeup fluid.

A preferred embodiment of the invention has been described in use with a vehicle brake system for purposes of illustration only. It is apparent this system can be used to leakage test any fluid system.

I claim:

1. A system for pressure leakage-testing closed fluid containing members comprising: a fluid circuit capable of being connected to said members while conducting the leakage test, control valves in said circuit, a fluid pressure intensifier also in said fluid circuit, electrical control circuitry automatically sequencing said control valve supplying fluid to said intensifier developing a first fluid pressure being supplied to the fluid-containing members for a specified time period sufficient to remove a major portion of the expansion inherent in said fluid-containing members, said electrical control circuitry automatically sequencing said control valves supplying fluid to said intensifier developing a reduced second fluid pressure for a specified time period stabilizing the rate of expansion of said fluid-containing members, said stabilized rate of expansion continuing in said members being within predetermined test tolerances, means automatically actuated by said electrical control circuitry maintaining the second pressure fluid in said fluid-containing members for a specific test time period, and means in said electrical control circuitry sensing and providing an indication of any leakage in the closed fluid-containing members.

2. A fluid leakage-testing system comprising: a hydraulic circuit supplying pressure fluid to a closed fluid system being tested, a pneumatic system intensifying the pressure of the fluid in the hydraulic circuit, automatic electrical control circuitry actuating components in the respective systems to subject the closed system to a first pressure fluid for a specified period of time sufficient to remove a majority of its inherent expansion, said circuitry automatically reducing the pressure of the fluid to a second value for a second specified time whereupon the rate of expansion is greatly reduced and stabilized within a desired test tolerance range, and means for maintaining this second pressure in the test system for a specified test time period whereby the automatic control circuitry senses any leakage and provides an indication thereof.

3. A leakage-testing system for fluid circuitry comprising: a hydraulic circuit including electrically operated valves and a fluid pressure intensifier, a pneumatic circuit including electrically actuated pressure regulating valves providing two preset pneumatic pressures to said hydraulic intensifier so that the hydraulic fluid is selectively pressurized at two levels, electrical control circuitry automatically sequencing said valves, an adapter connecting the hydraulic circuit to the fluid circuitry being tested, a leak meter assembly including a piston movable in response to any loss of fluid in the system under test, said piston movable within a plurality of coils whereby a proportional electrical signal is produced in response to leakage, the higher level hydraulic pressure generated by said intensifier being sufficient to remove a majority of the expansion inherent in the fluid circuitry, the second hydraulic pressure being sufficient to provide an adequate test while simultaneously the expansion rate is reduced to a rate within predetermined test tolerances, a test valve movable from open to closed positions by said electrical control circuitry, said test valve being open allowing the fluid to flow directly to the fluid circuitry under test when said intensifier pressurizes the fluid to the two levels, said test valve being closed for a test period of time by said electrical control circuitry while the second pressure fluid is being supplied, said leak meter measuring any passage of fluid to the test fluid circuitry during the test period, and on test completion means biasing said intensifier to a retracted position when the pneumatic pressure therein is exhausted, retraction of said intensifier withdrawing fluid from the circuitry under test reducing the pressure permitting removal of said adapter.

4. A vehicle brake leakage testing system comprising an adapter capable of being secured to the rear compensating port in a reservoir of a dual master cylinder, a leak meter attached to said adapter, an intensifier pressurizing a source of brake fluid for transmittal to said leak meter and said adapter, a first electrically controlled valve supplying air at a first pressure to said intensifier, a second electrically controlled valve supplying air at a reduced second pressure to said intensifier assembly, a fluid supply valve electrically controlled to selectively supply fluid to said intensifier assembly, electrical control means automatically energizing said first valve supplying air at said first pressure to said intensifier thereby supplying brake fluid at a first pressure to said vehicle brake system substantially completely expanding the system, said control means energizing said second valve supplying air at a second pressure to said intensifier whereby a reduced pressure fluid is supplied to the system for a predetermined stabilization time period, and means maintaining said reduced pressure fluid in the system for a test time period, said leak meter accurately measuring any loss of fluid therefrom.

5. A vehicle brake leakage-testing system comprising a hydraulic circuit including an electrically operated supply valve, a fluid pressure intensifier and an electrically operated test valve; a pneumatic circuit including electrically actuated pressure regulating valves providing two preset pneumatic pressures to said hydraulic intensifier, said hydraulic intensifier being selectively pressurized to intensify the hydraulic fluid selectively to two predetermined pressure levels respectively, in response to the preset pneumatic pressures; an adapter connecting said hydraulic circuit to the vehicle brake system through a compensating port in the master cylinder; a leak meter assembly and said test valve being directly connected to said adapter so that said test valve is capable of being closed to maintain pressure fluid directly in the vehicle brake system at the master cylinder so that the leak meter assembly only responds to loss of fluid from the vehicle brake system; said intensifier being selectively sequentially actuated to initially supply the vehicle brake system with 2,000 p.s.i. pressure fluid for a period of 10 seconds to remove a majority of expansion in the brake system conduits; the intensifier being actuated to reduce the pressure fluid to 1,600 p.s.i. for a 5 second stabilization period; said test valve being actuated to a closed position while maintaining 1,600 p.s.i. fluid in the vehicle brake system for a ten second test period; and automatic recording devices connected in electrical circuitry with said leak meter to measure any leakage occurring from the vehicle brake system.

6. A vehicle brake leakage-testing system comprising an adapter capable of being attached to the compensating port in the reservoir of a vehicle master cylinder, a leak meter attached to said adapter, a test valve also attached to said adapter, a hydraulic circuit supplying fluid to said adapter, a pressure intensifier in said hydraulic circuit for pressurizing the fluid prior to entrance into said adapter, a pneumatic circuit supplying pressurized air to said intensifier, a first pressure-regulating valve in said pneumatic circuit supplying air at a first value to said intensifier, a second electrically controlled pressure-regulating valve supplying air at a second pressure to said intensifier, electrical controlled circuitry automatically sequencing the energization of said pressure-regulating valves so that said intensifier first supplies pressure fluid at 2,000 p.s.i. to the vehicle brake system through said adapter for a period of 10 seconds, said circuitry then sequencing the valving to supply 1,600 p.s.i. fluid to the adapter for a period of 5 seconds for stabilization in the vehicle brake system, said control circuitry then actuating said test valve to maintain the 1,600 p.s.i. fluid in the brake system for a period of 10 seconds, and automatic electrical recording means connected to said leak meter to read any leakage sensed and record the same automatically, said electrical control circuitry automatically terminating the test should a leak occur when the 2,000 p.s.i. fluid is initially supplied to the vehicle brake system.

7. A method of leakage testing closed fluid containing members comprising the steps of connecting a fluid circuit to the closed members, supplying fluid from a source through the circuit to said closed members, intensifying the pressure of the fluid in said closed members to a first value for a time period sufficient to substantially completely expand and remove the stretch inherent in said members, reducing the intensified pressure fluid to a second value for a time period sufficient to stabilize the rate of expansion of the closed members, maintaining the fluid at the second pressure value in the closed members for a test time period, and measuring any loss of fluid indicating leakage in the closed members.

8. A method of leakage testing vehicle brake systems comprising the steps of connecting a test fluid circuit to the brake system, supplying fluid through the test circuit from a source to the brake system, intensifying the pressure of the fluid in the test system and the brake system to approximately 2,000 p.s.i. for an approximate 10 second time period sufficient to substantially completely expand the vehicle brake system thereby removing a majority of the stretch inherent in the system, reducing the intensified 2,000 p.s.i. pressure fluid to an approximate 1,600 p.s.i. value for an approximate 5 second time period to stabilize and significantly reduce the rate of expansion of the brake system, isolating the fluid in the vehicle brake system at the 1,600 p.s.i. pressure value for an approximate 10 second test period, and measuring any loss of the isolated pressure fluid in the brake system.

9. A method of leakage testing vehicle brake systems comprising the steps of connecting a test adapter to the vent port in a vehicle brake master cylinder, supplying fluid from a source through an intensifier to the adapter, intensifying the pressure of the fluid to said master cylinder to an approximate 2,000 p.s.i. value for an approximate 10 second time period substantially completely expanding the conduits in the vehicle brake system, reducing the pressure to the vehicle brake master cylinder to an approximate 1,600 p.s.i. value for an approximate 5 second time period stabilizing the pressure of the fluid and the rate of expansion of the fluid conduits, actuating a test valve located in the adapter to maintain the 1,600 p.s.i. fluid in the vehicle brake system, applying the maintained 1,600 p.s.i. pressure fluid to one end of the piston in a leak meter, applying the 1,600 p.s.i. fluid from the intensifier to the other end of the piston, measuring displacement of the piston electrically through a leak meter mounted in the adapter, and automatically electrically recording the output signal of said leak meter.

PO-1050
(5/69)

UNITED STATES PATENT OFFICE
CERTIFICATE OF CORRECTION

Patent No. __3,584,500__  Dated __June 15, 1971__

Inventor(s) __Ward F. Diehl, Robert E. Heintz and Marshall S. Swisher__

It is certified that error appears in the above-identified patent and that said Letters Patent are hereby corrected as shown below:

```
Column 4, line 40, "130-volt" should read -- 120-volt --

Column 7, line 25, "connecting" should read -- conducting --.
```

Signed and sealed this 11th day of January 1972.

(SEAL)
Attest:

EDWARD M. FLETCHER, JR.        ROBERT GOTTSCHALK
Attesting Officer              Acting Commissioner of Patents